US009544497B2

(12) United States Patent
Forutanpour et al.

(10) Patent No.: US 9,544,497 B2
(45) Date of Patent: Jan. 10, 2017

(54) SYSTEM AND METHOD FOR DETERMINING IMAGE RESOLUTION (71) Applicant: QUALCOMM Incorporated, San Diego, CA (US)

(72) Inventors: Babak Forutanpour, Carlsbad, CA (US); William Thomas Frantz, San Diego, CA (US); Shriram Ganesh, San Diego, CA (US); Daniel Scott Baker, San Diego, CA (US); Devender Akira Yamakawa, Burlingame, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 14/284,217

(22) Filed: May 21, 2014

(65) Prior Publication Data
US 2015/0341535 A1 Nov. 26, 2015

(51) Int. Cl.
*H04N 5/232* (2006.01)
*H04N 5/235* (2006.01)
*H04N 5/347* (2011.01)

(52) U.S. Cl.
CPC .......... *H04N 5/23219* (2013.01); *H04N 5/232* (2013.01); *H04N 5/235* (2013.01); *H04N 5/23241* (2013.01); *H04N 5/23293* (2013.01); *H04N 5/347* (2013.01)

(58) Field of Classification Search
CPC  H04N 5/232; H04N 5/23219; H04N 5/23241; H04N 5/23293; H04N 5/235; H04N 5/347
USPC ...................................... 348/222.1
See application file for complete search history.

(56) References Cited

U.S. PATENT DOCUMENTS

| | | | | |
|---|---|---|---|---|
| 5,949,483 A * | 9/1999 | Fossum | ................ | G11C 19/282 250/208.1 |
| 6,292,218 B1 * | 9/2001 | Parulski | ............... | H04N 1/0044 348/220.1 |
| 6,707,487 B1 * | 3/2004 | Aman | ................ | A63B 24/0003 348/169 |
| 7,068,316 B1 * | 6/2006 | Pine | ....................... | H04N 3/155 348/294 |
| 7,233,354 B2 * | 6/2007 | Voss | ..................... | H04N 3/1562 348/308 |
| 7,362,360 B2 | 4/2008 | Kim et al. | | |
| 7,460,695 B2 | 12/2008 | Steinberg et al. | | |
| 8,416,331 B2 * | 4/2013 | Thorne | ................ | H04N 3/1562 348/302 |

(Continued)

OTHER PUBLICATIONS

Partial International Search Report—PCT/US2015/029476—ISA/EPO—Jul. 20, 2015.

(Continued)

*Primary Examiner* — Lin Ye
*Assistant Examiner* — Chriss Yoder, III
(74) *Attorney, Agent, or Firm* — Knobbe, Martens, Olson & Bear LLP (57) ABSTRACT Systems and methods for deductively determining a resolution setting for an imaging device based on one or more features of a scene are disclosed. The features may include the size of primary or foreground faces within the scene, a maximum amount of high frequency content within the scene, a lighting condition of the scene, or a battery level of an electronic device.

24 Claims, 4 Drawing Sheets (56) References Cited

U.S. PATENT DOCUMENTS

| | | | |
|---|---|---|---|
| 8,471,783 B2* | 6/2013 | Rhodes | G02B 27/017 345/1.2 |
| 8,520,095 B2 | 8/2013 | Uchida | |
| 8,577,183 B2 | 11/2013 | Robinson | |
| 2006/0187324 A1 | 8/2006 | Lin | |
| 2006/0204055 A1* | 9/2006 | Steinberg | H04N 5/23212 382/118 |
| 2011/0267495 A1 | 11/2011 | Atkinson | |
| 2011/0274349 A1 | 11/2011 | Kalevo | |

OTHER PUBLICATIONS

International Search Report and Written Opinion—PCT/US2015/029476—ISA/EPO—Sep. 28, 2015.

* cited by examiner

SYSTEM AND METHOD FOR DETERMINING IMAGE RESOLUTION

BACKGROUND

Field of the Invention

The systems and methods disclosed herein relate generally to automatically and deductively determining an optimal image resolution.

Description of the Related Art

Users often set their cameras to shoot pictures at the highest resolution because they do not know when they may actually need the extra pixels for later zooming or panning. One downside of shooting at maximum resolution is the files are naturally bigger and even on today's mobile phones those pictures and video can fill up storage quickly. The embodiments discussed herein illustrate systems and methods for determining the resolution for each shot deductively, based on one or more of a number of factors.

SUMMARY

The systems, methods and devices of the disclosure each have several innovative aspects, no single one of which is solely responsible for the desirable attributes disclosed herein. Combinations of the innovations, aspects and features described herein can be incorporated in various embodiments of systems, methods, and devices, and such combinations are not limited by the examples of embodiments described herein.

Embodiments and innovations described herein relate to systems and methods that may be run in a processor on an electronic device for obtaining an image at an "optimal" resolution, such a resolution depending on one or more of a number of factors. These factors may include, but are not limited to, the size of primary faces within a scene, the maximum amount of high frequency content in the scene, the lighting conditions of the scene, and battery life of the device. An intuitive user experience is presented to allow the user to select one or more factors to be used in determining an optimal resolution of the capture image.

In some embodiments, the camera is selected and pointed at a scene. The scene may contain multiple regions of interest (ROIs), for example faces identified by a face detection function, or objects identified by an object tracking function. The size of one or more of the regions of interest, as a percentage of the total field of view, may be determined. Based on the size of the one or more regions of interest, a camera resolution setting may be increased or decreased to provide a determined highest quality image at the lowest resolution setting. In some embodiments, a maximum amount of high frequency content within the scene may be used to determine if a camera resolution setting should be increased or decreased. In some embodiments, a lighting condition of the scene may be determined. If the lighting condition is determined to be a low light condition a camera resolution setting may be increased and CCD binning used to lower the signal-to-noise ratio and increase the quality of the image. In some embodiments, a camera resolution setting may be decreased or increased based on the camera's battery charge level.

One aspect relates to a system for deductively determining an image capture resolution, including a control module configured to determine a scene-dependent resolution setting based on one or more features of a scene, and capture an image of the scene at the scene-dependent resolution setting. The control module may be further configured to set a default image capture resolution, and the control module may be further configured to determine a scene-dependent resolution setting based on one or more of sizes of regions of interest of the scene, an amount of high frequency content within the scene, a lighting condition of the scene, and a battery level of an electronic device. The system may further include an imaging device comprising an imaging sensor, and wherein the control module is further configured to operate the imaging device in a preview mode. In some embodiments, the control module may be further configured to determine regions of interest within the scene using one or more of a face detection algorithm or an object tracking algorithm. In some embodiment, the control may be further configured to classify the regions of interest as foreground or background regions of interest based on a pixel area of each region of interest. In other embodiments, the control module is further configured to increase a resolution setting if the pixel area of a foreground region of interest is less than 5% of a total field of view of the imaging sensor. In other embodiments, the control module is further configured to increase a resolution setting if the pixel area of a foreground region of interest is less than 8% of a total field of view of the imaging sensor. In some embodiments, the control module is further configured to identify a maximum amount of high frequency content in the scene by scanning the scene for edges using a fast Fourier transform or sliding window. In some embodiments, the control module is further configured to access a look up table to determine an increase to a resolution setting based on the amount of high frequency content with the scene. In other embodiments, the control module is further configured to determine a lighting condition of a scene and increase a resolution setting based on the lighting condition. In some embodiments, the control module is a component of a camera application for a mobile device.

In another aspect, a method for deductively determining an image capture resolution includes the steps of determining a scene-dependent resolution setting based on one or more features of a scene and capturing an image of the scene at the scene-dependent resolution setting. In some embodiments, the method further includes the steps of setting a default image capture resolution and determining a scene-dependent resolution setting based on one or more features of sizes of regions of interest of the scene, an amount of high frequency content within the scene, a lighting condition of the scene, and a battery level of an electronic device. In some embodiments, the method further includes the step of operating an imaging device in a preview mode. In other embodiments, the method further includes the step of determining regions of interest within a scene using one or more of a face detection algorithm or an object tracking algorithm. In other embodiments the method further includes the step of classifying the regions of interest as foreground or background regions of interest based on a pixel area of each region of interest. In some embodiments, the method further includes the step of increasing a resolution setting if the pixel area of a foreground region of interest is less than 5% of a total field of view of the imaging sensor. In other embodiments, the method further includes the step of identifying a maximum amount of high frequency content in the scene by scanning the scene for edges using a fast Fourier transform or sliding window. In other embodiments, the method further includes the step of increasing a resolution setting based on the amount of high frequency content with the scene. In some embodiments, the imaging device is configured to operate as part of a camera application for a mobile device.

In yet another aspect, an apparatus for deductively determining an image capture resolution includes means for determining a scene-dependent resolution setting based on one or more features of a scene and means for capturing an image of the scene at the scene-dependent resolution setting. In some embodiments, the apparatus further includes means for determining a scene-dependent resolution setting based on one or more of sizes of regions of interest of the scene, an amount of high frequency content within the scene, a lighting condition of the scene, and a battery level of an electronic device. In other embodiments, the apparatus further includes means for setting a default image capture resolution.

In another aspect, a non-transitory computer-readable medium stores instructions that, when executed, cause at least one physical computer processor to perform a method of deductively determining an image capture resolution based on features of a scene. The method can include the steps of determining a scene-dependent resolution setting based on one or more features of the scene and capturing an image of the scene at the scene-dependent resolution setting. In other embodiments, the method may further include the steps of setting a default image capture resolution and determining a scene-dependent resolution setting based on one or more features of sizes of regions of interest of the scene, an amount of high frequency content within the scene, a lighting condition of the scene, and a battery level of an electronic device. In some embodiments, the method may further include the step of operating an imaging device in a preview mode. In other embodiments, the method may further include the steps of determining regions of interest within a scene using one or more of a face detection algorithm or an object tracking algorithm and classifying the regions of interest as foreground or background regions of interest based on a pixel area of each region of interest. In some embodiments, the method may further include the step of increasing a resolution setting if the pixel area of a foreground region of interest is less than 5% of a total field of view of the imaging sensor. In other embodiments, the method may further include the steps of identifying a maximum amount of high frequency content in the scene by scanning the scene for edges using a fast Fourier transform or sliding window and increasing a resolution setting based on the amount of high frequency content within the scene. In some embodiments, the imaging device is configured to operate as part of a camera application for a mobile device.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

For ease of reference, a device, or a component of a device, that may be used to capturing an image or taking a picture, or capturing images (for example, video) may sometimes be referred to herein as a camera or an imaging system. Typically, cameras incorporated in a smart device (for example, cell phones, laptops, cameras, tablets, or other mobile devices) can be set, or configured to, capture an image at one of various levels of resolution. For example, a user may set the camera to capture images at the highest resolution if they plan to print or display the image, or the user could set the camera to capture images at a lower resolution if they plan to simply email or share the image via social media. Many times the user sets the resolution of the camera for capturing an image to the highest resolution without fully understanding the downsides to capturing images at this level of resolution or that this level of resolution may not be necessary for every image. As used herein, the methods and systems discussed below provide solutions to determine an optimal image resolution based on one or more factors of the scene, and may either suggest a resolution setting to the user or automatically set the resolution.

In some embodiments, the proposed resolution determination process directs a processor to determine a resolution setting based on one or more factors, for example, lighting (for example, ambient lighting of a scene), face detection, high frequency content of a scene battery charge level of the imaging system, or intended image usage determined automatically or as indicated by user. This resolution setting may be automatically determined for each image captured or may be an optional setting suggested to the user. The user may select a resolution for the image prior to image capture or may set the camera to automatically set the image capture resolution. When the camera is activated to capture the image, the image may be captured at the resolution setting either manually entered by the user or determined automatically by the processor. In some embodiments, after an image is captured by the imaging system, the system may receive an input from the user, which determines image resolution (for example, to store the image).

It is noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Embodiments may be implemented in System-on-Chip (SoC) or external hardware, software, firmware, or any combination thereof. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

System Overview

Figure 1:
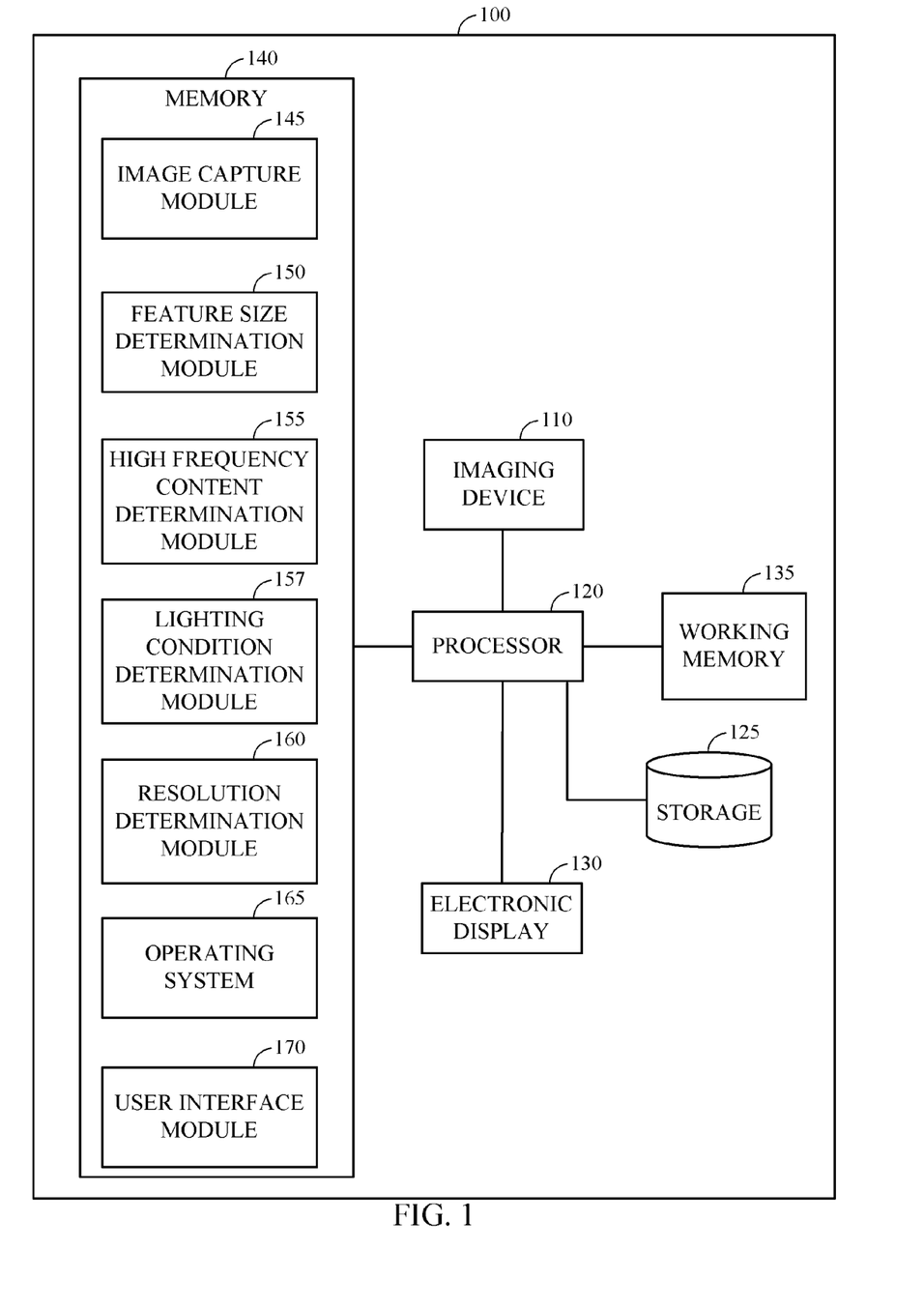
FIG. 1 is a block diagram depicting a system implementing some operative elements for determining a resolution for an imaging device.

FIG. 1 illustrates one example of an imaging system 100 configured to determine an (optimal) resolution for an image, based on one or more of a number of factors. The illustrated embodiment is not meant to be limiting, but is rather illustrative of certain components in some embodiments. System 100 may include a variety of other components for other functions which are not shown for clarity of the illustrated components.

The imaging system 100 may include an imaging device 110 and an electronic display 130. Certain embodiments of electronic display 130 may be any flat panel display technology, for example an LED, LCD, plasma, or projection screen. Electronic display 130 may be coupled to the processor 120 for receiving information for visual display to a user. Such information may include, but is not limited to, visual representations of files stored in a memory location, software applications installed on the processor 120, user interfaces, and network-accessible content objects.

Imaging device 110 may employ one or a combination of imaging sensors. The imaging system 100 can further include a processor 120 linked to the imaging device 110. A working memory 135, electronic display 130, and program memory 140 are also in communication with processor 120. The imaging system 100 may be a mobile device, a tablet, laptop computer, or cellular telephone.

Processor 120 may be a general purpose processing unit or it may be a processor specially designed for imaging applications for a handheld electronic device. As shown, the processor 120 is connected to, and in data communication with, program memory 140 and a working memory 135. In some embodiments, the working memory 135 may be incorporated in the processor 120, for example, cache memory. The working memory 135 may also be a component separate from the processor 120 and coupled to the processor 120, for example, one or more RAM or DRAM components. In other words, although FIG. 1 illustrates two memory components, including memory component 140 comprising several modules and a separate memory 135 comprising a working memory, one with skill in the art would recognize several embodiments utilizing different memory architectures. For example, a design may utilize ROM or static RAM memory for the storage of processor instructions implementing the modules contained in memory 140. The processor instructions may then be loaded into RAM to facilitate execution by the processor. For example, working memory 135 may be a RAM memory, with instructions loaded into working memory 135 before execution by the processor 120.

In the illustrated embodiment, the program memory 140 stores an image capture module 145, a feature size determination module 150, a high frequency content determination module 155, a lighting condition determination module 157, a resolution determination module 160, operating system 165, and a user interface module 170. These modules may include instructions that configure the processor 120 to perform various image processing and device management tasks. Program memory 140 can be any suitable computer-readable storage medium, for example a non-transitory storage medium. Working memory 135 may be used by processor 120 to store a working set of processor instructions contained in the modules of memory 140. Alternatively, working memory 135 may also be used by processor 120 to store dynamic data created during the operation of imaging system 100.

As mentioned above, the processor 120 may be configured by several modules stored in the memory 140. In other words, the processor 120 can run instructions stored in modules in the memory 140. Image capture module 145 may include instructions that configure the processor 120 to obtain images from the imaging device. Therefore, processor 120, along with image capture module 145, imaging device 110, and working memory 135, represent one means for obtaining image sensor data.

Still referring to FIG. 1, memory 140 may also contain feature size determination module 150. The feature size determination module 150 may include instructions that configure the processor 120 to determine the size of features, for example faces, within a scene and classify the features as foreground and background features, as will be described in further detail below. Therefore, processor 120, along with feature size determination module 150, working memory 135, and electronic display 130 represent one means for identifying and classifying features within a scene of interest based on the size of the features.

Memory 140 may also contain high frequency content determination module 155. The high frequency content determination module 155 may include instructions that configure the processor 120 to perform an autofocus function and calculate the high frequency content of the image. For example, if the scene of interest contains an area having a high degree of detail, for example a field of grass, the high frequency content determination module 155 autofocus function may return autofocus parameters corresponding to the high frequency content. Therefore, processor 120, along with high frequency content determination module 155, and working memory 135 represent one means for identifying a maximum amount of high frequency content in a scene of interest.

Memory 140 may also contain lighting condition determination module 157. The lighting condition determination module 157 may include instructions that configure the processor 120 to perform an auto white balance function to determine the amount and type of light in a scene of interest. For example, if the auto white balance function detects a low lighting condition, the lighting condition determination module 157 may instruct the processor 120 to shoot at a maximum resolution, and bin charge coupled device (CCD) elements to improve the signal-to-noise (SNR) ratio of the image. Therefore, processor 120, along with lighting condition determination module 157, and working memory 135 represent one means for identifying a lighting condition of a scene of interest.

Memory 140 may also contain a resolution determination module 160. The resolution determination module 160 illustrated in FIG. 1 may include instructions that configure the processor 120 to set the shooting resolution of an image based on data acquired by other functions of the processor 120. For example, if a feature detection function is performed on a scene of interest and a number of foreground features are identified, the processor 120 may be instructed by the resolution determination module 160 to increase the image capture resolution of the imaging device 110 based on the size and number of the foreground features, as will be described in greater detail below. Therefore, processor 120, along with feature size determination module 150, resolution determination module 160, and working memory 135 represent one means for dynamically adjusting an image capture resolution of an imaging device based on a size and number of detected features in a scene of interest.

In another example, a user may be shooting an image containing blades of grass or other features that include a large amount of detail (for example, edges), as detected by the high frequency content determination module 155. In this example, the processor 120 may be instructed by the resolution determination module 160 to increase the image capture resolution of the imaging device 110 based on the amount of high frequency content in the scene of interest; or lower the resolution for an image containing relatively low amount of detail. Therefore, processor 120, along with high frequency content determination module 155, resolution determination module 160, and working memory 135 represent one means for dynamically adjusting an image capture resolution of an imaging device based on a maximum amount of high frequency content in a scene of interest.

In yet another example, a user may be shooting an image in a low light condition, for example indoors or at night, as detected by the lighting condition determination module 157. In this example, the processor 120 may be instructed by the resolution determination module 160 to increase the image capture resolution of the imaging device 110 based on the detected lighting condition of the scene of interest. Therefore, processor 120, along with lighting condition determination module 157, resolution determination module 160, and working memory 135 represent one means for dynamically adjusting an image capture resolution of an imaging device based on a detected lighting condition of a scene of interest.

Memory 140 may also contain user interface module 170. The user interface module 170 illustrated in FIG. 1 may include instructions that configure the processor 120 to provide a collection of on-display objects and soft controls that allow the user to interact with the device, for example allowing the user to select a suggested image capture resolution or acknowledge an automatic image capture resolution setting of the imaging device. The user interface module 170 may also allow applications to interact with the rest of the system. An operating system module 165 may also reside in memory 140 and operate with processor 120 to manage the memory and processing resources of the system 100. For example, operating system 165 may include device drivers to manage hardware resources, for example, the electronic display 130 or imaging device 110. In some embodiments, instructions contained in the feature size determination module 150, high frequency content determination module 155, lighting condition determination module 157 and resolution determination module 160 may not interact with these hardware resources directly, but instead interact through standard subroutines or APIs located in operating system 165. Instructions within operating system 165 may then interact directly with these hardware components.

Processor 120 may write data to storage module 125. While storage module 125 is represented graphically as a traditional disk drive, those with skill in the art would understand multiple embodiments could include either a disk-based storage device or one of several other types of storage mediums, including a memory disk, USB drive, flash drive, remotely connected storage medium, virtual disk driver, or the like.

Although FIG. 1 depicts a device comprising separate components to include a processor, imaging device, electronic display, and memory, one skilled in the art would recognize that one or more of these separate components may be combined in a variety of ways to achieve particular design objectives. For example, in an alternative embodiment, the memory components may be combined with processor components to save cost and improve performance.

Additionally, although FIG. 1 illustrates two memory components, including memory component 140 comprising several modules and a separate memory 135 comprising a working memory, one with skill in the art would recognize several embodiments utilizing different memory architectures. For example, a design may utilize ROM or static RAM memory for the storage of processor instructions implementing the modules contained in memory 140. Alternatively, processor instructions may be read at system startup from a disk storage device that is integrated into imaging system 100 or connected via an external device port. The processor instructions may then be loaded into RAM to facilitate execution by the processor. For example, working memory 135 may be a RAM memory, with instructions loaded into working memory 135 before execution by the processor 120.

Method Overview

Embodiments of the invention relate to a process for determining an optimal image resolution, which can include enabling a resolution determination mode of an imaging device in which the system determines a resolution to use to capture an image of a scene based on one or more features of the scene. The examples may be described as a process, which be depicted as a flowchart, a flow diagram, a finite state diagram, a structure diagram, or a block diagram. Although a flowchart may describe the operations as a sequential process, many of the operations may be performed in parallel, or concurrently, and the process may be repeated. In addition, the order of the operations may be re-arranged. A process may be terminated when its operations are completed. A process may correspond to a method, a function, a procedure, a subroutine, a subprogram, etc. When a process corresponds to a software function, its termination may correspond to a return of the function to the calling function or the main function.

Figure 2:
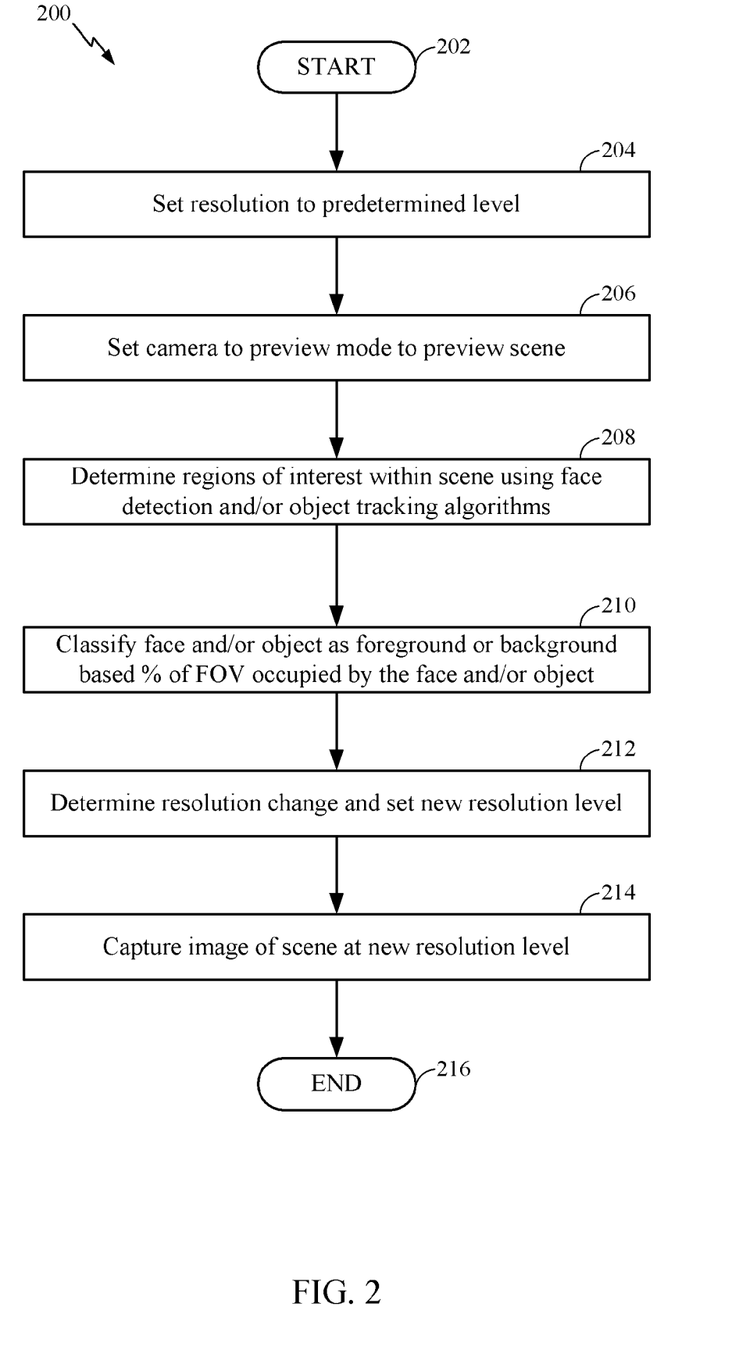
FIG. 2 is a flow chart illustrating one embodiment of a process for determining a resolution for an imaging device.

FIG. 2 illustrates one example of an embodiment of a process 200 to configure an electronic device having an imaging device (for example imaging device 110 shown in FIG. 1) to perform scene-dependent image resolution determination that may be implemented in one or more of the modules depicted in FIG. 1. In various implementations, process 200 may include one or more additional process features, or not include a certain illustrated feature. In some examples, the process 200 may be run on a processor, for example, processor 120 (FIG. 1), and on other components illustrated in FIG. 1 that are stored in memory 140 or that are incorporated in other hardware or software. In some embodiments, at least a portion of process 200 may be implemented in hardware.

The process 200 begins at start block 202 and transitions to block 204 wherein the default image capture resolution is set to a predetermined resolution. In some embodiments, a predetermined resolution maybe selected based on, for example, the size of the memory storage space available on the device, the user's past selections of a default resolution, or the levels of resolutions available, for example, at a mid-point resolution, or one or more other factors. For example, in some embodiments, the default image capture resolution may be set to one-third the maximum resolution of the imaging device 110. In other embodiments, the default image capture resolution may be set to any fraction of the maximum resolution, such as one-eighth, one-sixth, one-fourth, one-half, etc.

Next, process 200 transitions to block 206, wherein the imaging device 110 is operated in a preview mode to preview the scene of interest. In some embodiments, a preview mode may include displaying on an electronic display, for example, electronic display 130 (FIG. 1) the scene as viewed by the lens of the imaging device 110. The electronic device may be a handheld communication device, e.g., a cellular phone or "smartphone," or a mobile personal data assistant (PDA) including a tablet computer. For example, the user may operate the camera of a mobile device in a preview mode to determine whether or not to capture an image. In another example, the user may operate the camera of the mobile device in a preview mode to determine what resolution to use to capture an image of the scene.

The process 200 then transitions to block 208, wherein the processor, for example processor 120, is instructed to determine regions of interest, for example faces or objects, within the current scene. In some embodiments, the processor may use face detection algorithms or object tracking algorithms to identify possible regions of interest. For example, a face detection algorithm may determine that eight faces appear within the scene. In another example, an object tracking algorithm might identify a number of items placed within a neutral background, for example a pail, sand castle, and a bird on a beach. Preferably, the regions of interest are determined during preview mode as an ongoing process. Preferably, the process 200 as run by imaging system 100 is not dependent on the specific face detection algorithm used so long as the selected algorithm can adequately detect faces. In some embodiments, a face detection algorithm, for example, the Viola Jones face detection algorithm available in OpenCV may be used. Similarly, the process 200 as run by imaging system 100 is also desirably not dependent on the object tracking algorithm used so long as accurate object tracking may be determined. Once the possible regions of interest have been determined, process 200 transitions to block 210.

In block 210, process 200 may instruct the processor is instructed to classify the detected faces or objects as foreground or background faces or objects. In some embodiments, classifying each face or object as a foreground or background face or object may be based on histogram cut-off size distributions. For example, histogram cut-off size distributions can indicate the percent of field of view (FOV) occupied by the foreground or background faces or objects. The area of the foreground and/or background faces and objects may be expressed as pixel×pixel areas of the image sensor or of an image with the present field of view. The faces or objects may be classified as foreground faces or objects based on whether the percent of FOV occupied by the faces or objects is above a predetermined threshold. For example, if three faces occupy 5% of the entire field of view (FOV) of the imaging device 110 and there are eight other faces which together occupy about 2% of the FOV, the processor will determine that there are three foreground or primary faces. In one example, in a typical image, a face should occupy at least around 5%, or 1/20 of the FOV to be considered a primary or foreground face. In other embodiments, a face may occupy at least around 2%, 3%, or 4% of the FOV to be considered a primary or foreground face. However, in other embodiments, the criteria or threshold used to separate the primary or foreground faces or objects from background faces or objects may be defined by the user.

Process 200 next transitions to block 212 and the process 200 determines whether to increase the image capture resolution of the imaging device 110 based on the size of the primary face or object as compared to a predetermined threshold. This may be done by providing instructions to the processor for this action. In some embodiments, if a primary face occupies a calculated percentage of the FOV, then the processor may be instructed to access stored information in memory to determine the resolution for the given face size, as indicated by block 212. For example, if a primary face occupies a calculated percentage of the FOV, then the processor may be instructed to access a look-up table (LUT) to determine the resolution for the given face size, as indicated by block 212. In other embodiments, the resolution for the given face size may be determined by a mathematical function.

In one example, for every specified number of sharp edges detected, such as 1000, the resolution may be increased by 2 mega-pixels (MP). In other embodiments, a sharp edge detection threshold may be set to other values, such as 500, 1000, 1500, 2000, etc. with each threshold associated with a resolution increase, such as 1 MP, 2 MP, 3 MP, 4 MP, etc. In one example, if a face occupies approximately 15% of the FOV, then the image will be captured at the default resolution setting, which may be 3 mega-pixels (MP). In another example, if the primary faces occupy less than 8% of the FOV, then the processor may be instructed to adjust the resolution so that the image is shot at a higher resolution, for example 5 MP.

In another example, if the faces occupy less than 5% of the FOV, the processor may be instructed to adjust the resolution so that the image is shot at a maximum resolution, for example 10 MP. In other words, if the faces and/or objects are found to be a small area of the FOV, the resolution is desirably increased. If the faces and/or objects occupy a larger area of the FOV, the resolution may remain the same as the default resolution or may be decreased. In each example, the maximum resolution is dependent on the maximum resolution of the imaging device 110 and therefore different thresholds for image capture resolution may be set based on the resolution of the imaging device 110. Once the resolution has been determined and set, process 200 transitions to block 214 wherein the processor is instructed to capture an image of the scene at the optimized scene-dependent resolution, as indicated by block 214. Once the image has been captured at the scene-dependent resolution, process 200 may transition to block 216 and end.

Figure 3:
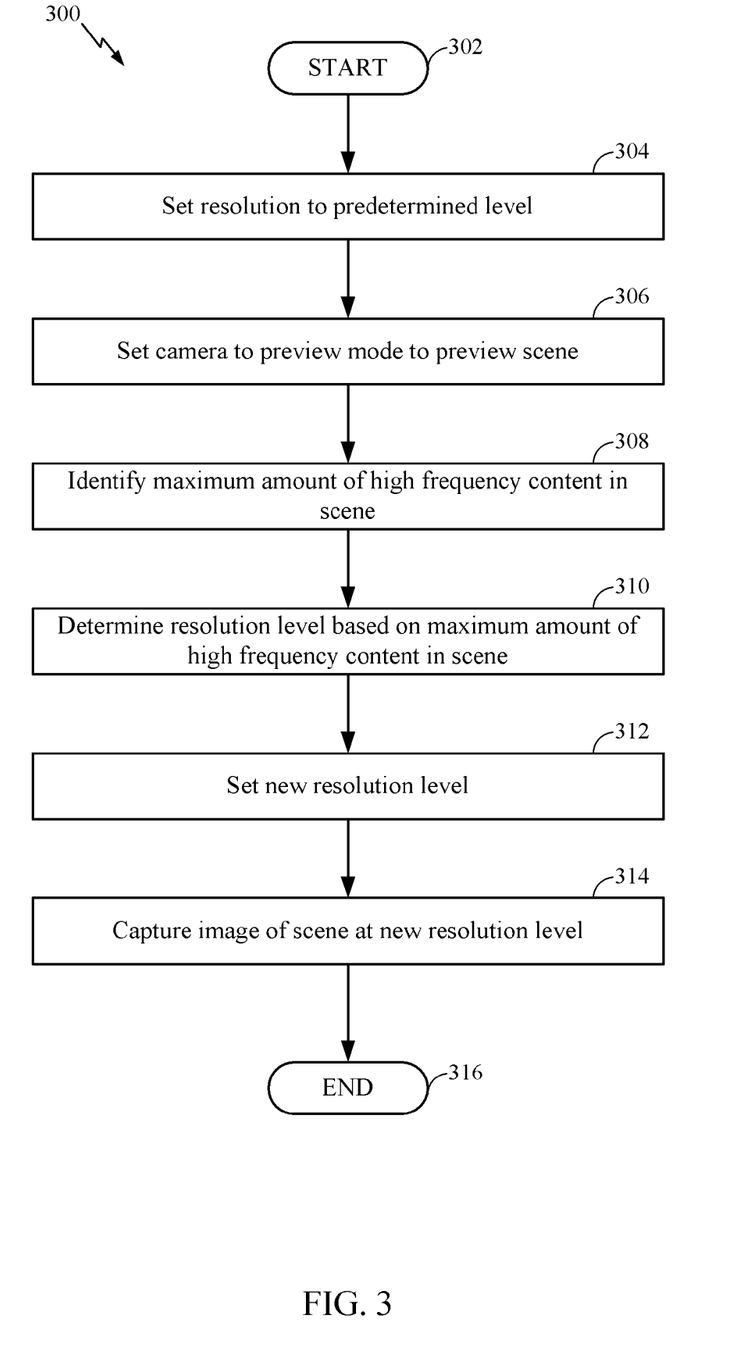
FIG. 3 is a flow chart illustrating another embodiment of a process for determining a resolution for an imaging device.

FIG. 3 illustrates another example of an embodiment of a process to configure an electronic device having an imaging device (for example imaging device 110 shown in FIG. 1) to perform scene-dependent image resolution that may be implemented in one or more of the modules depicted in FIG. 1. In some examples, the process 300 may be run on a processor, for example, processor 120 (FIG. 1), and on other components illustrated in FIG. 1 that are stored in memory 140 or that are incorporated in other hardware or software.

Process 300 begins at start block 302 and transitions to block 304 wherein the default image resolution is set to a predetermined resolution. For example, in some embodiments, as discussed above, the default image capture resolution could be set to one-third the maximum resolution of the imaging device 110. Next, process 300 transitions to block 306, wherein the imaging device 110 may be operated in a preview mode to preview the scene of interest to determine if a change in resolution is needed.

Process 300 next transitions to block 308, wherein the processor may be instructed to identify a maximum amount of high frequency content in the image. Sharpness is arguably the most important photographic image quality factor because it determines the amount of detail an imaging system can reproduce. Sharpness may be defined by the boundaries or edges between zones of different tones or colors. Using a sharpness detector, for example a Fast Fourier Transform or a sliding window, a sharpness of the image may be determined. The maximum amount of high frequency content can be determined by the high frequency scores at the autofocus position where the image is the sharpest. Next, in block 310, the processor may be instructed to determine the image resolution based on the maximum of high frequency content in the scene. If the amount of high frequency content in the image is higher than a predetermined threshold, then the image resolution will be increased. For example, if the user is shooting a picture of a blue sky or the ocean, the default resolution or a lower resolution setting may be sufficient. However, if the user is shooting an image which has high frequency content for example blades of grass or other detail features, the resolution is desirably increased to capture the detail of the image. In some embodiments, a look up table may be used to determine what resolution should be used to capture images with various amounts of high frequency content. Once the optimal resolution is determined, process 300 transitions to block 312 wherein the processor is instructed to set the resolution at the optimal, scene-dependent resolution setting. Next, in block 314, an image of the scene is captured by the imaging device 110 at the scene-dependent resolution setting. After acquiring the image, process 300 transitions to block 316 and ends.

Figure 4:
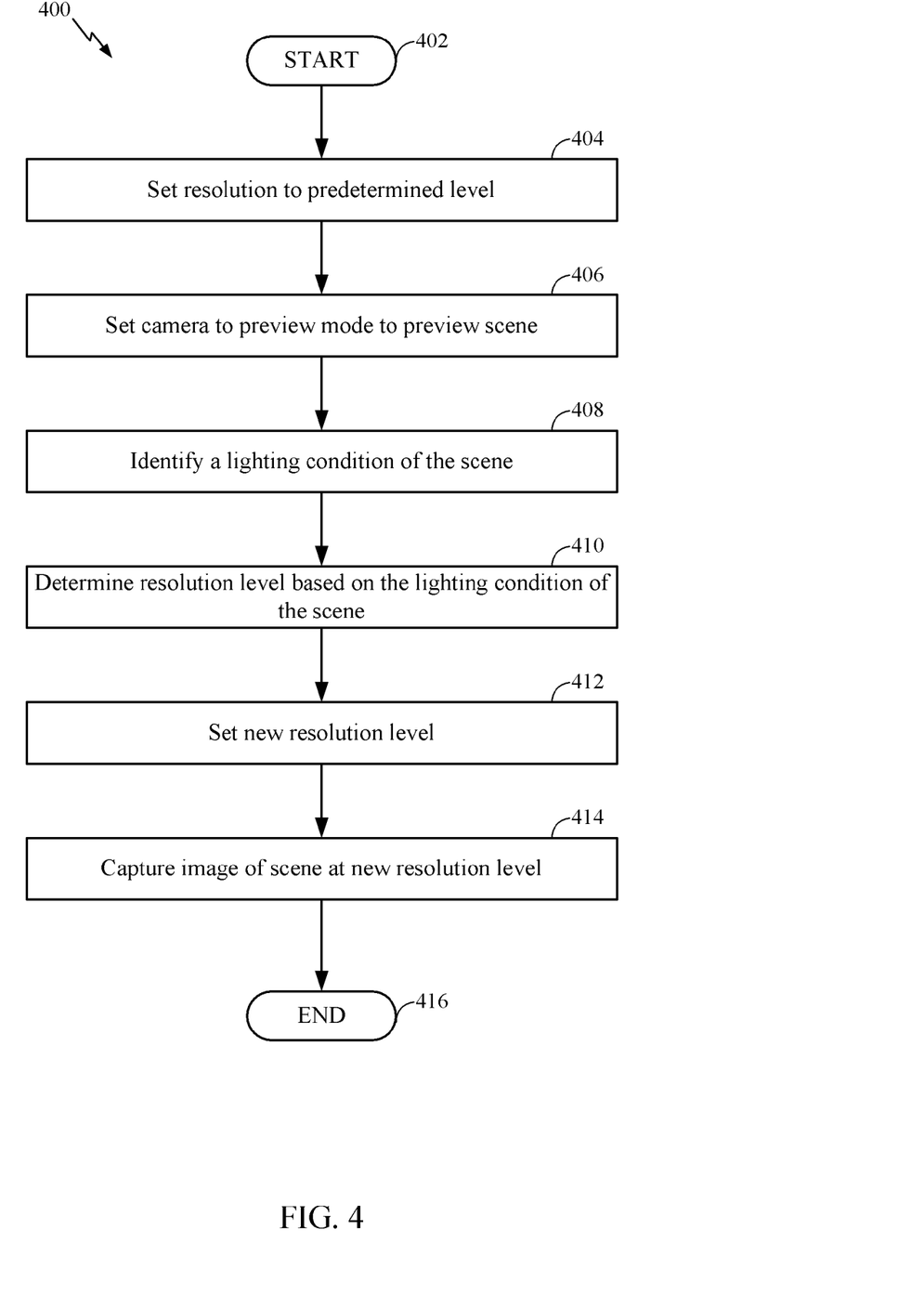
FIG. 4 is a flow chart illustrating yet another embodiment of a process for determining a resolution for an imaging device.

FIG. 4 illustrates another example of an embodiment of a process to configure an electronic device having an imaging device (for example imaging device 110 shown in FIG. 1) to perform scene-dependent image resolution that may be implemented in one or more of the modules depicted in FIG. 1. In some examples, the process 400 may be run on a processor, for example, processor 120 (FIG. 1), and on other components illustrated in FIG. 1 that are stored in memory 140 or that are incorporated in other hardware or software.

Process 400 begins at start block 402 and transitions to block 404 wherein the default image resolution is set to a predetermined resolution. For example, in some embodiments, as discussed above, the default image capture resolution could be set to one-third the maximum resolution of the imaging device 110. Next, process 400 transitions to block 406, wherein the imaging device 110 may be operated in a preview mode to preview the scene of interest to determine if a change in resolution is needed.

Process 400 next transitions to block 408, wherein the processor may be instructed to identify a lighting condition of a scene to determine whether the default resolution will be sufficient. In some embodiments, an auto white balance feature may be used to determine the light level of the scene. The minimum detectable light source depends on the image sensor of the imaging device, specifically the size of the image sensor. For example, based on the number of lumens detected, the processor may be instructed to enable binning. Binning, as applied to charge coupled devices (CCDs), allows charges from adjacent pixels to be combined, offering benefits such as faster readout speeds and improved signal-to-noise ratios at the expense of reduced spatial resolution. Taking a photo in a low light condition, for example indoors or in a dimly-lit restaurant, will trigger the processor to determine the resolution level required for the given lighting condition, as indicated by the next step, block 410. Once the optimal resolution for the given lighting condition is determined, the process 400 transitions to block 412 wherein the processor is instructed to set the resolution at the optimal, scene-dependent resolution setting. If a low-lighting condition is detected, the processor will instruct the imaging device 110 to shoot images at maximum resolution but bin CCD elements to improve the signal-to-noise ratio. Next, in block 414, an image of the scene is captured by the imaging device 110 at the scene-dependent resolution setting. In one example, the camera may shoot a low-lighting scene at 40MP to create a 3MP image. After acquiring the image, process 400 transitions to block 416 and ends. Process 400 may be used to create an optimal image file, given a low-lighting condition, regardless of the custom settings that may be selected.

In yet another example, the current battery level of the electronic device may trigger a change to the image resolution in order to conserve battery power. For example, if the device determines that the current battery charge of the device may not allow the device to be operated with the current settings until the next expected charging period, the processor may be instructed to lower the image resolution such that the imaging device 110 acquires images at lower resolution to conserve battery life. In some embodiments, the processor may be instructed to run an application to resize images when the electronic device is plugged in and charging.

The examples discussed above with respect to processes 200, 300, and 400 may be implemented individually in an electronic device or one or more of the processes may be implemented together. In some embodiments, one or more of the processes or examples discussed above for scene-dependent image resolution may be implemented during pre-image capture functions of the imaging device, for example during autofocus or auto white balance functions. In some embodiments, scene-dependent resolution processes such as those described above may be implemented post-image capture. In embodiments where scene-dependent resolution processes are implemented post-image capture, the acquired images may be resized prior to storage to save disk space.

In some embodiments, where more than one factor is considered to determine resolution, the factors can be weighted to determine which factors will control, or mostly control, the resolution. In some embodiments, the factors can be evaluated in conjunction with each other to determine the desired resolution.

Clarifications Regarding Terminology

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A system for determining an image capture resolution, comprising:
a processor configured to
operate an imaging device to obtain an image of a scene in a preview mode at a default image capture resolution;
determine sizes of one or more regions of interest in the image of the scene;
determine a scene-dependent resolution setting based on the determined sizes, the scene-dependent resolution setting being higher or lower than the default resolution, wherein the scene-dependent resolution setting is:
higher than the default resolution if a pixel area of a foreground region of the one or more regions of interest is less than a percentage of a field of view of the imaging device, and
lower than the default resolution if the pixel area of the foreground region is not less than the percentage of the field of view of the imaging device;
adjust the image capture resolution for the imaging device to the scene-dependent resolution setting; and
obtain an image of the scene at the scene-dependent resolution setting.

2. The system of claim 1, further comprising the imaging device, the imaging device comprising an imaging sensor.

3. The system of claim 2, wherein the processor is further configured to determine the regions of interest in the image of the scene using one or more of a face detection algorithm or an object tracking algorithm.

4. The system of claim 3, wherein the processor is further configured to classify the regions of interest as foreground or background regions of interest based on a pixel area of each region of interest.

5. The system of claim 4, wherein the processor is further configured to receive an input from a user specifying the percentage of the field of view of the imaging device.

6. The system of claim 4, wherein the processor is further configured to increase the image capture resolution if the pixel area of a foreground region of interest is less than 5% of a total field of view of the imaging sensor.

7. The system of claim 1, wherein the processor is further configured to identify a maximum amount of high frequency content in the scene by scanning the scene for edges using a fast Fourier transform or sliding window.

8. The system of claim 7, wherein the processor is further configured to access a look up table to determine an increase to a resolution setting based on the amount of high frequency content with the scene.

9. The system of claim 1, wherein the processor is further configured to determine a lighting condition of a scene and increase a resolution setting based on the lighting condition.

10. The system of claim 1, wherein the processor operates as a component of a camera application for a mobile device.

11. A method for determining an image capture resolution, comprising:
operating an imaging device in a preview mode at a default image capture resolution to obtain an image of a scene;
determining sizes of one or more regions of interest in the image of the scene;
determining a scene-dependent resolution setting based on the determined sizes, the scene-dependent resolution setting being higher or lower than the default resolution, wherein the scene-dependent resolution setting is:
higher than the default resolution if a pixel area of a foreground region of the one or more regions of interest is less than a percentage of a field of view of the imaging device, and
lower than the default resolution if the pixel area of the foreground region is not less than the percentage of the field of view of the imaging device;
adjusting the image capture resolution for the imaging device to the scene-dependent resolution setting; and
capturing with the imaging device an image of the scene at the scene-dependent resolution setting.

12. The method of claim 11, further comprising determining the regions of interest using one or more of a face detection algorithm or an object tracking algorithm.

13. The method of claim 12, further comprising classifying the regions of interest as foreground or background regions of interest based on a pixel area of each region of interest.

14. The method of claim 13, further comprising receiving an input from a user setting the percentage of the field of view of the imaging device.

15. The method of claim 11, further comprising identifying a maximum amount of high frequency content in the scene by scanning the scene for edges using a fast Fourier transform or sliding window.

16. The method of claim 15, further comprising increasing a resolution setting based on the amount of high frequency content with the scene.

17. The method of claim 11, further comprising operating the imaging device to operate as part of a camera application for a mobile device.

18. An apparatus for determining an image capture resolution, comprising:
means for operating an imaging device in a preview mode at a default resolution to obtain an image of a scene;
means for determining sizes of one or more regions of interest in the image of the scene;
means for determining a scene-dependent resolution setting based on the determined sizes of the one or more regions of interests, the scene-dependent resolution setting being higher or lower than the default resolution, wherein the scene-dependent resolution setting is:
higher than the default resolution if a pixel area of a foreground region of the one or more regions of interest is less than a percentage of a field of view of the imaging device, and
lower than the default resolution if the pixel area of the foreground region is not less than the percentage of the field of view of the imaging device;
means for adjusting the image capture resolution for the imaging device to the scene-dependent resolution setting; and
means for capturing an image of the scene at the scene-dependent resolution setting.

19. A non-transitory computer-readable medium storing instructions that, when executed, cause at least one physical computer processor to perform a method of determining an image capture resolution based on features of a scene, the method comprising:
operating the imaging device in a preview mode at a default image capture resolution to obtain an image of a scene;
determining sizes of one or more regions of interest in the image of the scene;
determining a scene-dependent resolution setting based on the determined sizes, the scene-dependent resolution setting being higher or lower than the default resolution, wherein the scene-dependent resolution setting is:
higher than the default resolution if a pixel area of a foreground region of the one or more regions of interest is not less than a percentage of a field of view of the imaging device, and
lower than the default resolution if the pixel area of the foreground region is not less than the percentage of the field of view of the imaging device;
adjusting the image capture resolution for the imaging device to the scene-dependent resolution setting; and
capturing with the imaging device an image of the scene at the scene-dependent resolution setting.

20. The non-transitory computer-readable medium of claim 19, the method further comprising operating an imaging device in a preview mode.

21. The non-transitory computer-readable medium of claim 19, the method further comprising determining the regions of interest using one or more of a face detection algorithm or an object tracking algorithm and classifying the regions of interest as foreground or background regions of interest based on a pixel area of each region of interest.

22. The non-transitory computer-readable medium of claim 19, wherein the percentage comprises a user-specified percentage.

23. The non-transitory computer-readable medium of claim 19, further comprising identifying a maximum amount of high frequency content in the scene by scanning the scene for edges using a fast Fourier transform or sliding window and increasing a resolution setting based on the amount of high frequency content within the scene.

24. The non-transitory computer-readable medium of claim 19, the method further comprising operating the imaging device as part of a camera application for a mobile device.

* * * * *